(No Model.)

E. S. HALL.
VEHICLE BRAKE.

No. 589,779. Patented Sept. 7, 1897.

WITNESSES:
Donn Twitchell
Mitchell Hall

INVENTOR
Edward Spencer Hall
BY
Alvin K. Goodwin
ATTORNEY

UNITED STATES PATENT OFFICE.

EDWARD SPENCER HALL, OF NEW YORK, N. Y.

VEHICLE-BRAKE.

SPECIFICATION forming part of Letters Patent No. 589,779, dated September 7, 1897.

Application filed March 18, 1896. Serial No. 583,751. (No model.)

*To all whom it may concern:*

Be it known that I, EDWARD SPENCER HALL, a citizen of the United States, residing at the city of New York, county and State of New York, have invented certain new and useful Improvements in Vehicle-Brakes, of which the following is a specification.

The object of this invention is to improve the bicycle-brake shown in my prior Letters Patent, Nos. 545,492 and 554,419, and in such manner as shall increase the effectiveness of the clamping action of the coil brake device and assure noiseless action of the brake and promote the durability of the entire brake mechanism.

The invention will first be described, and then will be defined in claims hereinafter set forth.

Reference is made to the accompanying drawings, forming part of this specification, and in which—

Figure 1:
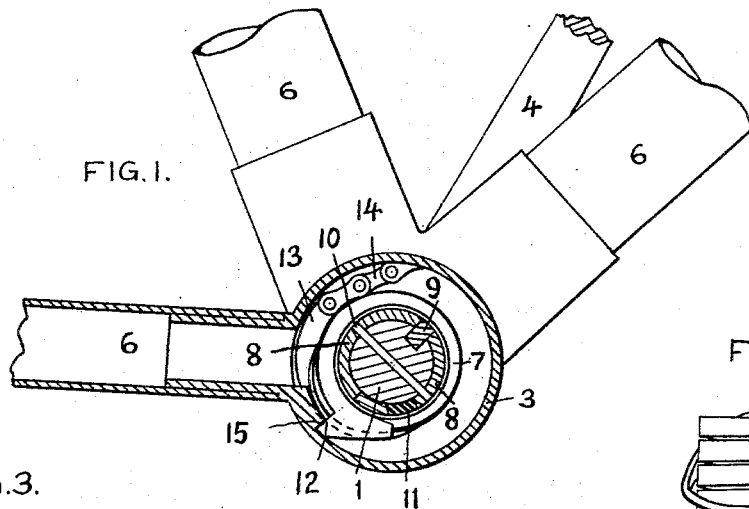
Figure 4:
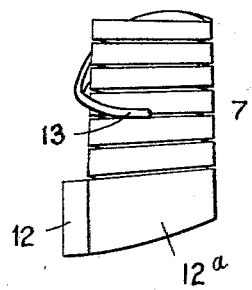
Figure 3:
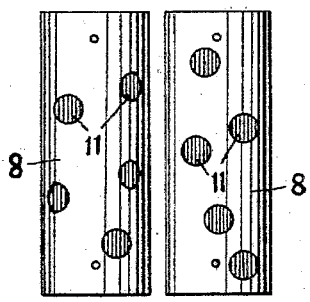
Figure 2:
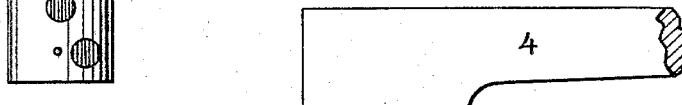
Figure 2:
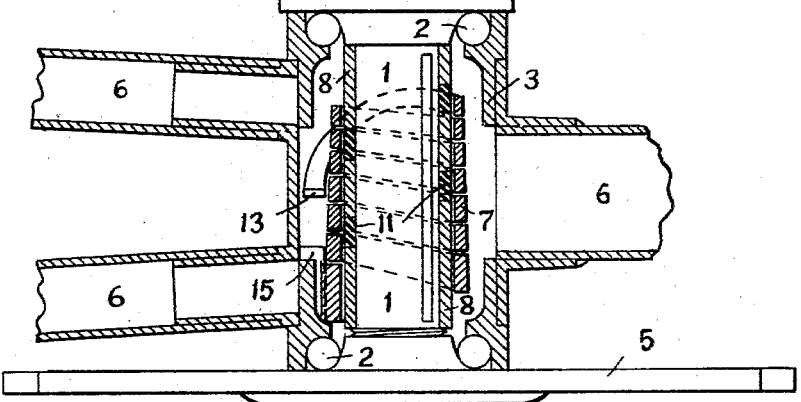

Figure 1 is a longitudinal sectional view across the pedal crank-axle of a bicycle fitted with my improved brake. Fig. 2 is a sectional plan view thereof. Fig. 3 shows the outer convex faces of one form of bushing interposed between the axle and brake-coil, and Fig. 4 is a side elevation of the brake-coil.

The numeral 1 indicates the crank shaft or axle, sustained, preferably, by ball-bearings 2, fitted to the tubular bracket or casing 3 of the vehicle-frame. The axle has pedals 4, from which a sprocket 5 is turned to actuate driving mechanism propelling the vehicle. The other tubular parts 6 of the frame connect with the bracket 3 in any suitable manner.

A spiral-coil brake device 7, somewhat like that shown in my prior patent, No. 554,419, is here used, but instead of placing the brake-coil directly on the crank-axle I now interpose a bushing 8 between the axle and coil. This bushing may be in one piece having interior screw-threads fitting exterior threads on the axle, but it is shown made in two parts, with a key 9 at one joint entering a seat in the axle and having pins 10 holding the two parts to the axle. The bushing always rotates with the axle and forms practically a part thereof.

The bushing preferably has a series of holes or channels, which may have any desired form or arrangement and are filled with a suitable lubricant 11. A semisolid lubricant is preferred—such, for instance, as a plumbago-paste compound—which prevents overheating of the bushing and brake-coil when the brake is applied and also facilitates release of the coil from the axle by the normal opening resiliency of the coil. This bushing has special and important functions transcending those of the ordinary bushing, which merely provides a renewable friction-surface between two wearing parts, and as hereinafter more fully explained.

The brake-coil 7 shown is formed of one piece of metal, preferably low-carbon spring-steel, which is harder than the metal of the bushing and tapers, preferably, both in width and thickness from one end, and therefore has increasing resiliency toward the thinner end. The successive turns of the coil are wound in direction of rotation of the axle. At its heavier end $12^a$ the coil has a holdback-shoulder 12, and its other lighter end 13 is preferably bent laterally and is attached to any suitable pulling connection—such, for instance, as a chain 14, which preferably runs through one of the frame-tubes 6 and when drawn upon by any appliance in reach of the rider contracts or clamps the brake-coil more or less tightly upon the bushing to apply the brake to any desired degree, the coil-shoulder 12 then abutting any suitable stop 15 on the crank-hanger bracket 3. It will be seen that the brake-coil 7 and bushing 8 are fully protected from the dust and dirt of the road by the crank-hanger bracket 3 and the outer ball-bearing cones, which also protect the ball-bearings of the axle.

Noiseless or non-squealing action of a bicycle-brake is most essential, because a squealing brake frightens horses on the road, thereby endangering persons riding or driving them or occupying vehicles, as well as the bicycle-rider himself.

When a bicycle is running downgrade, the crank-axle, having a diameter of about three-quarters of an inch, is rotated from the rear wheel, having a diameter of about two feet. With a rider weighing from one hundred and fifty to two hundred pounds the increasing momentum while running downhill causes rotation of the axle with great force, and the required pressure of a brake coil or device on the axle to quickly and safely stop the vehicle has been estimated at about five tons. This tremendous pressure evolved problems regarding noiseless action of the brake and the general efficiency and durability of the brake which were difficult to solve.

During a long series of experiments I have proved that in a fully-successful noiseless brake of this character the axle-surface on which the brake-coil acts must have a uniform hardness throughout and that this axle contact-surface must differ in grade, quality, or hardness from the acting surface of the brake-coil. I have also proved that the softer axle contact-surface must be sufficiently hard to offer necessary resistance to the friction-surface of the harder resilient brake-coil and also hard enough to prevent its being torn away by the coil. I have also proved that the very best results are obtained when special provision is made for introducing a lubricant between the opposing softer axle-surface and harder brake-coil to keep the parts cool, and thereby avoid drawing the temper of the coil and assure unfailing self-release of the coil from the axle when the brake-applying pull is relaxed.

In my early experiments I placed directly upon a steel axle a brake-coil formed nearly like the coil shown in the drawings and made of low-carbon spring-steel. The contact-surface of the axle proved to have a varying hardness, due probably to drawing the temper of parts of it more or less by heating it for forging on it the inner ball-bearing cones. This combination of axle and brake-coil invariably caused squealing sounds when the brake was applied. It then occurred to me that by putting a uniformly-tempered bushing over the axle the bushing would present to the brake-coil a contact-surface having a uniform grade, quality, or hardness throughout, due to the uniform original or specially-given temper which the uniformly thick wall of the bushing was capable of receiving independently of all forging or other heating operations on the crank-axle.

I tried a steel bushing having the same grade or temper as the steel brake-coil; but this combination produced loud squealing sounds when the coil was clutched upon the bushing to apply the brake, and the contact-surfaces of the coil and bushing were also quickly torn by attrition of minute hard metal particles balling up from the bushing or coil and lodging between them, and the temper of the coil was drawn so that it lost that degree of resiliency necessary to assure its prompt normal unclutching from the bushing. The introduction of a lubricant between the coil and bushing made little or no change, as the clutched coil quickly squeezed out every particle of the lubricant from between the uniformly hard contact-surfaces of the bushing and coil and the annoying squealing sounds continued. I then tried a bushing of hard merchantable brass with the result of quickly tearing up the bushing-surface by the coil, the bushing being too soft to withstand the great frictional strains brought upon it by the harder resilient brake-coil. I then tried bushings of phosphor-bronze, thinking that these antifriction metals as now obtainable had qualities which would assure success; but these failed, as they simply glazed over and would not permit sufficient frictional grip of the hard brake-coil on them to promptly stop the vehicle. I then tried bushings made of merchantable machine-steel and placed on them a brake-coil made of low-carbon tool-steel, known as "spring-steel," tempered to maintain its normal expansive resiliency. This combination of bushing and coil was in large measure successful, as the squealing was entirely obviated and the harder coil took immediate hold of the softer bushing to promptly stop the vehicle. Continued severe tests disclosed tendencies to overheating of the coil and bushing, and I then made special provision for introducing a lubricant between the bushing and coil. This proved fully satisfactory, because while the lubricant permitted prompt and effective application of the brake-coil to stop the vehicle it did not allow overheating of the bushing or coil and therefore preserved the resiliency of the coil, thus assuring its instant self-release from the bushing when the pulling force was relaxed. The lubricant required renewal but occasionally, say once a month, as it was not wholly squeezed from between the unequally hard contact-surfaces of the bushing and coil. The plumbago-paste lubricant held in the channels of the bushing, as above mentioned, well serves these purposes. I thus proved that by using a bushing having a contact-surface of uniform hardness throughout and enough softer than the brake-coil to assure proper degree of friction between the bushing and coil, while preventing tearing up of the bushing by the applied coil, (and preferably with a lubricant interposed between the bushing and coil,) all conditions necessary to a noiseless, efficient, and durable bicycle-brake were fully realized and a practically perfect brake obtained. This has been amply demonstrated by a bicycle used an entire summer in riding thousands of miles in the Catskill and Berkshire hills, where the brake was very often applied while coasting down long steep grades, and at the end of the season the brake-coil had not lost its resiliency and the contact-surfaces of both coil and bushing were in good order, permitting continued use of the same bushing and coil.

The advantages of my axle-brake are obvious when compared with spoon-brakes acting on a pneumatic bicycle-tire, because spoon-brakes quickly wear the tire and promote early deflation of it through its pores, and the application of such spoon-brakes also brings excessive breaking strains on the wheel fork or frame. With my axle coil brake the bicycle-tires are not in any way affected, nor is the bicycle-frame overstrained or broken by application of the brake.

My improved brake may be applied at either the front or rear wheel axle of a bicycle; but I prefer to apply it at the pedal crank-axle and between the ball-bearings thereof, where it is amply protected within the crank-hanger bracket from the dust and dirt of the road.

It may be possible to obtain a finished bicycle-axle which has a circumferential surface of uniform hardness throughout, but enough softer than the resilient brake-coil to assure sufficient degree of noiseless frictional contact between the axle and coil when the brake is applied, while at the same time preventing tearing up of the axle-surface by the applied coil. With such an axle the essential features of my invention would be realized in a satisfactorily-working brake and without using the bushing. As there is almost always more or less forging or heating work on a bicycle-axle, which gives a varying temper and hardness to its surface, the use of the bushing is preferable, as it may unfailingly have a uniformly hard circumferential surface of proper temper relatively to the brake-coil to certainly obviate squealing of the applied brake.

I am not aware of any prior clutching-coil mechanism in which strains from a large and heavily-loaded wheel of over two feet in diameter upon a friction-surface of less than an inch in diameter are brought to such an extent as in my bicycle-brake, and I believe the early practical operation of my brake disclosed novel conditions and requirements not before met in brake devices of this character, and it was only after the most persistent experimental use that the dangerous squealing noises were fully obviated, as I have herein described.

I claim as my invention—

1. The combination, with a vehicle-axle having a uniformly hard circumferential surface, of a friction brake-coil surrounding the axle and adapted to clamp the same, said axle-surface being enough softer than the brake-coil to assure sufficient degree of noiseless frictional contact between the axle and coil when the brake is applied while preventing tearing up of the axle-surface by the coil; and means in reach of the vehicle-rider tightening the coil on the axle, substantially as described.

2. The combination, with a vehicle-axle, of a bushing thereon having a uniformly hard circumferential surface, and a friction brake-coil surrounding the bushing and adapted to clamp the same, said bushing being enough softer than the brake-coil to assure sufficient degree of noiseless frictional contact between the bushing and coil when the brake is applied while preventing tearing up of the bushing-surface by the coil; and means in reach of the vehicle-rider tightening the coil on the bushing, substantially as described.

3. The combination, with a vehicle-axle having a uniformly hard circumferential surface, of a friction brake-coil surrounding the axle and adapted to clamp the same, said axle-surface being enough softer than the brake-coil to assure sufficient degree of noiseless frictional contact between the axle and coil when the brake is applied while preventing tearing up of the axle-surface by the coil, a cooling lubricant interposed between the axle and coil, and means in reach of the vehicle-rider tightening the coil on the axle, substantially as described.

4. The combination in a brake and with a vehicle-axle having a uniformly hard circumferential surface and the vehicle-frame having a stop 15, of a resilient tapering spiral brake-coil 7, on the axle and having heavy end $12^a$ and a holdback-shoulder 12 adapted to the stop 15; a pulling connection leading from the lighter end of the brake-coil, and an appliance in reach of the rider operating said pulling connection and thereby tightening the coil on the axle and applying the brake, said axle-surface being enough softer than the brake-coil to assure sufficient degree of noiseless frictional contact between the axle and coil when the brake is applied while preventing tearing up of the axle-surface by the coil, substantially as described.

5. The combination in a brake and with a vehicle-axle, of a bushing on the axle having a uniformly hard circumferential surface and the vehicle-frame having a stop 15, of a resilient tapering brake-coil 7, placed on the bushing and having heavy end $12^a$, and a holdback-shoulder 12 adapted to the stop 15; a pulling connection leading from the lighter end of the brake-coil, and an appliance in reach of the rider operating said pulling connection and thereby tightening the coil on the bushing and applying the brake, said bushing-surface being enough softer than the spiral brake-coil to assure sufficient degree of noiseless frictional contact between the bushing and coil when the brake is applied while preventing tearing up of the bushing-surface by the coil, substantially as described.

6. The combination in a brake and with a vehicle-axle, of a bushing on the axle having a uniformly hard circumferential surface and the vehicle-frame having a stop 15, of a resilient tapering brake-coil 7, placed on the bushing and having heavy end $12^a$, and a holdback-shoulder 12 adapted to the stop 15; a pulling connection leading from the lighter end of the brake-coil, and an appliance in reach of the rider operating said pulling connection and thereby tightening the coil on the bushing and applying the brake, said bushing-surface being enough softer than the spiral brake-coil to assure sufficient degree of noiseless frictional contact between the bushing and coil when the brake is applied while preventing tearing up of the bushing-surface by the coil, said bushing also having channels receiving a lubricant preventing overheating of it and the brake-coil, substantially as described.

EDWARD SPENCER HALL.

Witnesses:
A. MITCHELL HALL,
GRACE B. CRONYN.